US011230952B2

(12) United States Patent
Green

(10) Patent No.: US 11,230,952 B2
(45) Date of Patent: Jan. 25, 2022

(54) ENGINE MONITORING APPARATUS

(71) Applicant: Perkins Engines Company Limited, Peterborough (GB)

(72) Inventor: Christopher J. Green, Peterborough (GB)

(73) Assignee: Perkins Engines Company Limited, Peterborough (GB)

(*) Notice: Subject to any disclaimer, the term of this patent is extended or adjusted under 35 U.S.C. 154(b) by 139 days.

(21) Appl. No.: 16/621,440

(22) PCT Filed: Jun. 27, 2018

(86) PCT No.: PCT/EP2018/067338
§ 371 (c)(1),
(2) Date: Dec. 11, 2019

(87) PCT Pub. No.: WO2019/002422
PCT Pub. Date: Jan. 3, 2019

(65) Prior Publication Data
US 2021/0140351 A1    May 13, 2021

(30) Foreign Application Priority Data
Jun. 29, 2017    (GB) .................................... 1710459

(51) Int. Cl.
*F01M 11/04*    (2006.01)
*F01M 11/10*    (2006.01)
(Continued)

(52) U.S. Cl.
CPC ............. *F01M 11/04* (2013.01); *F01M 11/10* (2013.01); *G01L 13/00* (2013.01); *G01M 15/05* (2013.01); *F01M 2011/0491* (2013.01)

(58) Field of Classification Search
CPC ................... F01M 11/04; F01M 11/10; F01M 2011/0491; F01M 2013/0083;
(Continued)

(56) References Cited

U.S. PATENT DOCUMENTS 3,368,520 A    2/1968 Beaton et al.
4,189,940 A    2/1980 Hulls et al.
(Continued)

FOREIGN PATENT DOCUMENTS

CN          2101228 U      4/1992
CN          101126637      2/2008
(Continued)

OTHER PUBLICATIONS

International Search Report for related International Application No. PCT/EP2018/067338; report dated Sep. 6, 2018.
(Continued)

*Primary Examiner* — Freddie Kirkland, III
(74) *Attorney, Agent, or Firm* — von Briesen & Roper, s.c.

(57) ABSTRACT

An engine oil filler cap for monitoring an internal combustion engine comprises: a processor; and a sensor module comprising a pressure sensor configured to sense crankcase pressure of the internal combustion engine and to output data representative of the sensed crankcase pressure to the processor. The engine oil filler cap is configured to provide a housing for the processor. The processor is configured to determine a value representative of the firing frequency of the internal combustion engine based on the output data.

14 Claims, 9 Drawing Sheets

(51) Int. Cl.
*G01L 13/00* (2006.01)
*G01M 15/05* (2006.01)

(58) Field of Classification Search
CPC ........ G01L 13/00; G01L 23/30; G01M 15/05; G01M 15/12; G01M 15/042; G01M 15/046; F02D 41/0097
See application file for complete search history.

(56) References Cited

U.S. PATENT DOCUMENTS

| | | | |
|---|---|---|---|
| 4,622,851 A | 11/1986 | Wilson | |
| 4,719,792 A | 1/1988 | Eriksson | |
| 7,621,176 B2* | 11/2009 | Layher | F02B 77/085 |
| | | | 73/115.01 |
| 8,924,166 B2* | 12/2014 | Von Herzen | G01N 27/02 |
| | | | 702/50 |
| 9,435,670 B2* | 9/2016 | Hall | G01D 11/30 |
| 9,568,461 B2* | 2/2017 | Von Herzen | F01M 11/10 |
| 9,659,414 B2* | 5/2017 | Staley | H04Q 9/00 |
| 9,982,580 B2* | 5/2018 | Staley | F01M 11/12 |
| 10,253,716 B2* | 4/2019 | Mentele | F02D 41/2429 |
| 10,527,523 B2* | 1/2020 | Worden | G01K 13/00 |
| 10,823,099 B1* | 11/2020 | Hall | F02D 41/0097 |
| 11,008,964 B2* | 5/2021 | Green | G01M 15/042 |
| 2007/0285228 A1* | 12/2007 | Fortson | G01D 11/245 |
| | | | 340/539.22 |
| 2008/0041144 A1 | 2/2008 | Layher et al. | |
| 2010/0315246 A1 | 12/2010 | Gilpatrick | |
| 2014/0116808 A1* | 5/2014 | Kile | F16N 29/00 |
| | | | 184/108 |
| 2014/0266065 A1* | 9/2014 | Von Herzen | G01N 33/2888 |
| | | | 320/137 |
| 2016/0025027 A1 | 1/2016 | Mentele | |
| 2016/0210793 A1 | 7/2016 | Staley et al. | |
| 2016/0290191 A1 | 10/2016 | Staley et al. | |
| 2017/0040520 A1* | 2/2017 | Gillette | H02J 13/00032 |
| 2020/0141338 A1* | 5/2020 | Green | F01M 13/0033 |
| 2020/0149994 A1* | 5/2020 | Green | G01M 15/04 |
| 2021/0148300 A1* | 5/2021 | Green | F02D 41/22 |
| 2021/0156764 A1* | 5/2021 | Green | F02D 41/0097 |
| 2021/0231634 A1* | 7/2021 | Gillette | G01N 33/2847 |

FOREIGN PATENT DOCUMENTS

| | | |
|---|---|---|
| CN | 201255922 | 6/2009 |
| CN | 202611801 U | 12/2012 |
| DE | 20315466 U1 | 1/2004 |
| WO | WO 2014/207777 A1 | 12/2014 |

OTHER PUBLICATIONS

United Kingdom Search Report tor related GB Application No. 1710459.7 report dated Oct. 27, 2017.

Development and Research of Ship Diesel Engine Monitoring System, Xiaochun Wang, Full-text database of Chinese Excellent Master's Degree Thesis, Engineering Science and Technology Series II, 2010.

* cited by examiner

ENGINE MONITORING APPARATUS

CROSS-REFERENCE TO RELATED APPLICATION

This Application is a 35 USC § 371 US National Stage filing of International Application No. PCT/EP2018/067338 filed on Jun. 27, 2018 which claims priority under the Paris Convention to United Kingdom Patent Application No. 1710459.7 filed on Jun. 29, 2017.

TECHNICAL FIELD

The present disclosure relates to apparatus for monitoring the performance of an internal combustion engine. For example, the present disclosure relates to smart devices for monitoring the performance of an internal combustion engine and transmitting engine data to a remote device.

BACKGROUND

Physical objects and/or devices are increasingly provided with the capability to be networked together. Often referred to as the "Internet of Things", the ability for objects and/or devices to be uniquely identified and integrated into a communication network allows for additional functionality to be provided. Typically, such networked devices/objects are referred to as "smart" devices/objects.

For example, everyday objects/devices may include a module which monitors the performance/operation of the device and a module which communicates information regarding the performance/operation of the device over a network (i.e. the internet) to a remote device/object. Alternatively, a network connection between device/objects may be used to remotely send instructions and/or control signals to an interconnected device/object.

Typically, a smart device/object communicates with a remote device/object over a network. For example, a remote device to which a "smart" devices/object may connect to may be a server, a smart phone app or another "smart" device. Further, the network connection between the devices may be provided by, for example, an internet connection, a wireless internet connection (WiFi), a Bluetooth connection, a mobile internet connection or a combination of the above.

Often, incorporating "smart" functionality into devices/objects requires special design considerations. The module for performing the monitoring and communication may require a power source and/or a means of communicating over a network. Accordingly, devices/objects are often specially designed to incorporate smart features. As such, incorporating smart features into existing devices is often challenging.

In particular, "smart" functionality is increasingly being incorporated into machines that use engines in order to provide improved monitoring of such machines.

One known type of device for monitoring such a machine is an engine data logger. Engine data loggers may be used to monitor various engine parameters over time, such as engine speed. Monitoring engine speed over time may help with analysis of various aspects of the engine and its use, for example how a machine operator is typically using the machine's engine, what likely engine wear may be, etc.

Existing engine data loggers tend to be large and costly, either requiring an interface to a Control Area Network (CAN) bus in order to obtain a reading of the current engine speed from an Engine Control Unit (ECU), or requiring additional measurement equipment (such as mechanical, magnetic or laser tachometers, or fuel measurement equipment). Establishing an interface to the CAN bus may be difficult and time consuming, and providing additional measurement equipment may be costly and inconvenient.

Some existing engine data loggers may be configured to establish an internet connection with a server, where engine speed measurements may be stored over time and/or analysed. Establishing such connections can be costly, inconvenient and potentially unreliable, for example when the machine is located at the geographical limits of an internet network (for example, at the geographical limits of a Radio Access Network (RAN) cell, or at the geographical limits of a WiFi network area, etc).

Furthermore, it may also be desirable to obtain data in relation to a legacy machine that does not have appropriate inbuilt sensing and/or communications functionality. Accordingly, it may be desirable to attach such sensing functionality to an engine retrospectively. There may be a desire to achieve the functionality with maximum ease and minimum downtime.

Against this background there is provided an engine oil filler cap for monitoring an internal combustion engine comprising:
a processor;
a sensor module comprising a pressure sensor configured to sense crankcase pressure of the internal combustion engine and to output data representative of the sensed crankcase pressure to the processor;
wherein the engine oil filler cap is configured to provide a housing for the processor; and
the processor is configured to determine a value representative of the firing frequency of the internal combustion engine based on the output data.

Advantageously, therefore, the data sensing and monitoring functionality may be self-contained within an engine oil filler cap. This facilitates straightforward replacement of a conventional mechanical engine oil filler cap with one that also provides sensing and monitoring functionality. It does not require any significant machine downtime for installation. Furthermore, it does not require any costly modifications to interior engine components that would be difficult to reach without stripping down the machine and/or engine. In addition, its presence is discrete and it may not even be noticeable to a machine operator.

Engine crankcase pressure is related to other engine characteristics that may be calculated by modest processing capacity within the engine oil filler cap.

For example, the processor may be configured to measure crank case pressure at high speed. This may be used to calculate engine firing frequency and also to calculate a root mean squared (RMS) value of high speed crankcase pressure. The RMS value can be used to calculate engine torque.

The processor may be configured to generate an aggregated summary of the total engine running at each combination of firing frequency and root mean squared engine crank case pressure.

By aggregating the data in this way, it is possible to summarise engine usage using a very modest amount of memory. This in turn means that transmission of the data requires only modest bandwidth.

The aggregated summary may be updated at a predetermined update frequency by incrementing the aggregated summary with a current value of firing frequency and a current value of root mean squared engine crank case pressure.

In this way, an overview of engine usage over a lifetime may be developed without recording an exponentially increasing quantity of data.

For example, the aggregated summary may take the form of a histogram.

The engine oil filler cap may further comprise a communications module, configured to transmit the aggregated summary.

Since the amount of data stored in the aggregated summary does not increase with time, the amount of data to be transmitted remains modest throughout the lifetime of engine use. Also, if data transmitted by the communications module is occasionally not received by the intended recipient, it is of no long term consequence since the next aggregated summary that is received successfully will provide all of the aggregated data up to that point (which includes the previously unreceived data).

The engine oil filler cap may further comprise an inner portion, an outer portion and a seal between the inner portion and the outer portion. The inner portion may be configured to be received into an engine oil filler cap aperture of an engine. The seal may be configured to seal the engine oil filler cap aperture of the engine.

In this way, the engine oil filler cap performs the mechanical requirements of a conventional engine oil filler cap.

The engine oil filler cap may comprise a first fluid conduit between an exterior surface of the inner portion and a first sensing port of the pressure sensor.

In this way, the first sensing port of the pressure sensor may be in direct fluid contact with the crankcase of the engine.

The engine oil filler cap may further comprise a second fluid conduit between an exterior surface of the outer portion and a second sensing port of the pressure sensor.

In this way, the second sensing port of the pressure sensor may be in direct fluid contact with atmosphere.

The pressure sensor may be a differential pressure sensor configured to sense a differential pressure between the first sensing port and the second sensing port.

The processor may be configured to receive engine crankcase pressure and to determine a frequency of crankcase pressure oscillation thereby to determine the value representative of the firing frequency.

Accordingly, modest processing power may be required to calculate firing frequency from the sensed data.

The sensor module may further comprise a vibration sensor, wherein the sensed characteristic of the internal combustion engine comprises vibration data with time.

The sensed characteristic may comprises both engine crankcase pressure and engine vibration data. The processor may use both engine crankcase pressure and engine vibration data to improve accuracy of firing frequency.

The engine oil filler cap may comprise one or more additional transducers, such as a temperature sensor, wherein, optionally, the communications module is configured to transmit data derived from the one or more additional transducers.

In this way, further data may be transmitted onward for engine monitoring.

BRIEF DESCRIPTION OF THE DRAWINGS

A first embodiment of the invention will now be described with reference to the accompanying drawings in which.

SPECIFIC DESCRIPTION

Figure 1A:
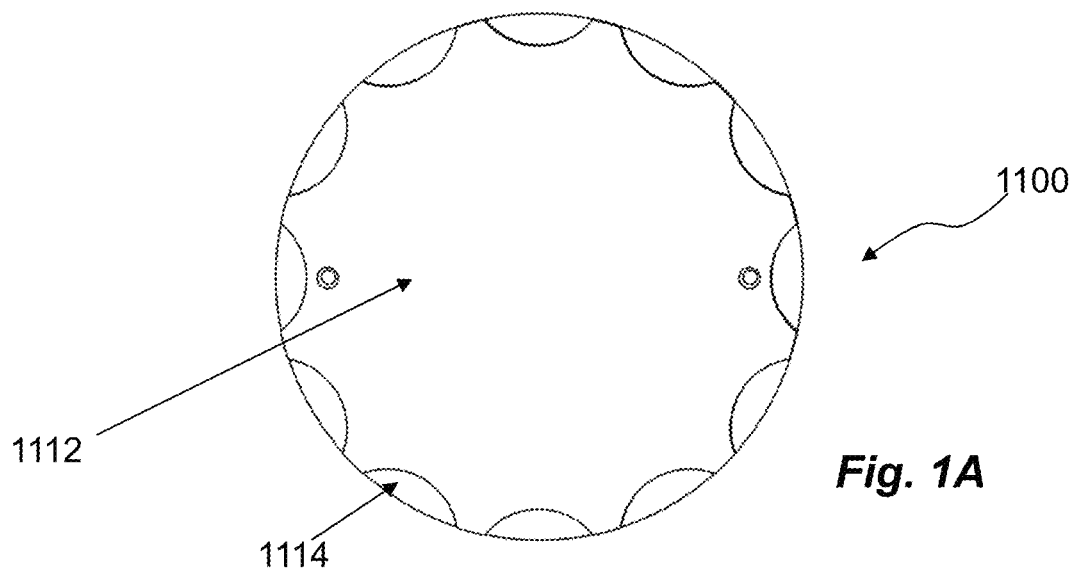
FIGS. 1A, 1B and 1C show a smart oil filler cap according to the first embodiment.
Figure 1B:
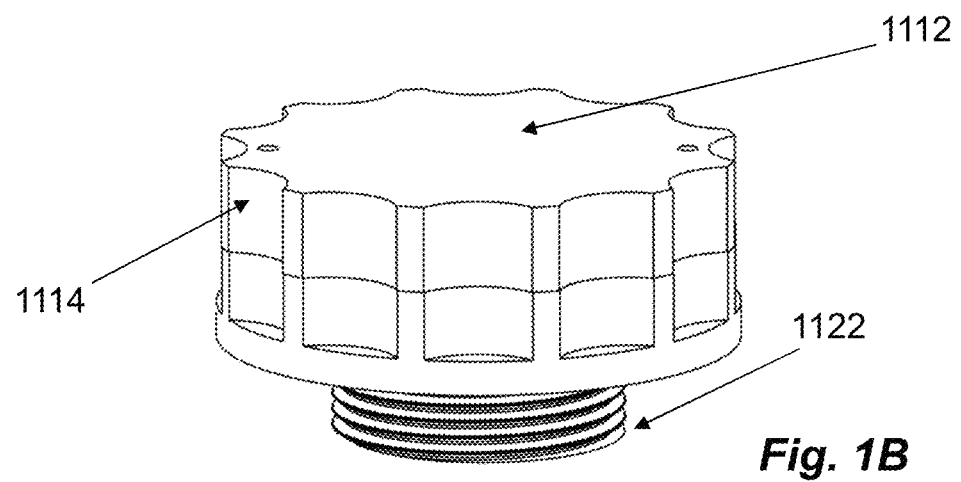
Figure 1C:
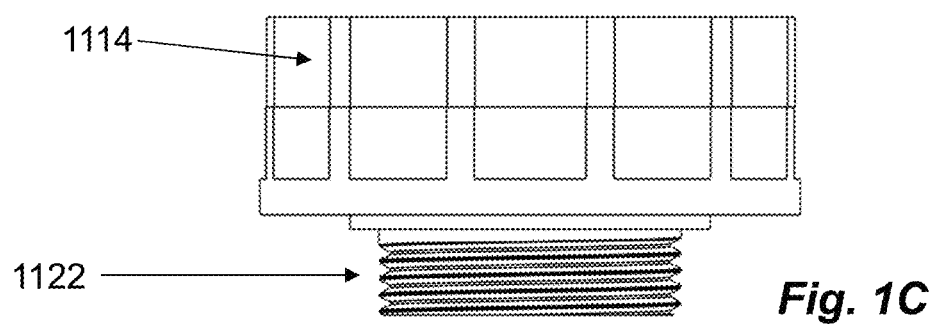

FIG. 1 shows a smart oil filler cap 1100 according to a first embodiment of the disclosure.

The smart oil filler cap 1100 comprises an outer portion having a top surface 1112 and grip grooves 1114 and an inner portion comprising an engine engagement part 1122, which is designed to engage with an oil inlet of an engine. As such, the engine engagement part 1122 may have an internal or external screw thread for engaging with a corresponding screw thread on the oil inlet of the engine. Thus, the smart oil filler cap 1100 may be screwed into place on the engine in order to cover the oil inlet to prevent dirt or other contaminants entering the engine oil. The engine engagement part 1122 comprises a seal that may be integral or separate for providing a seal between the smart oil filler cap 1100 and an engine oil inlet of an engine, when in use. In this way, the smart oil filler cap 1100 provides all the functionality of a prior art engine oil filler cap.

Figure 2:
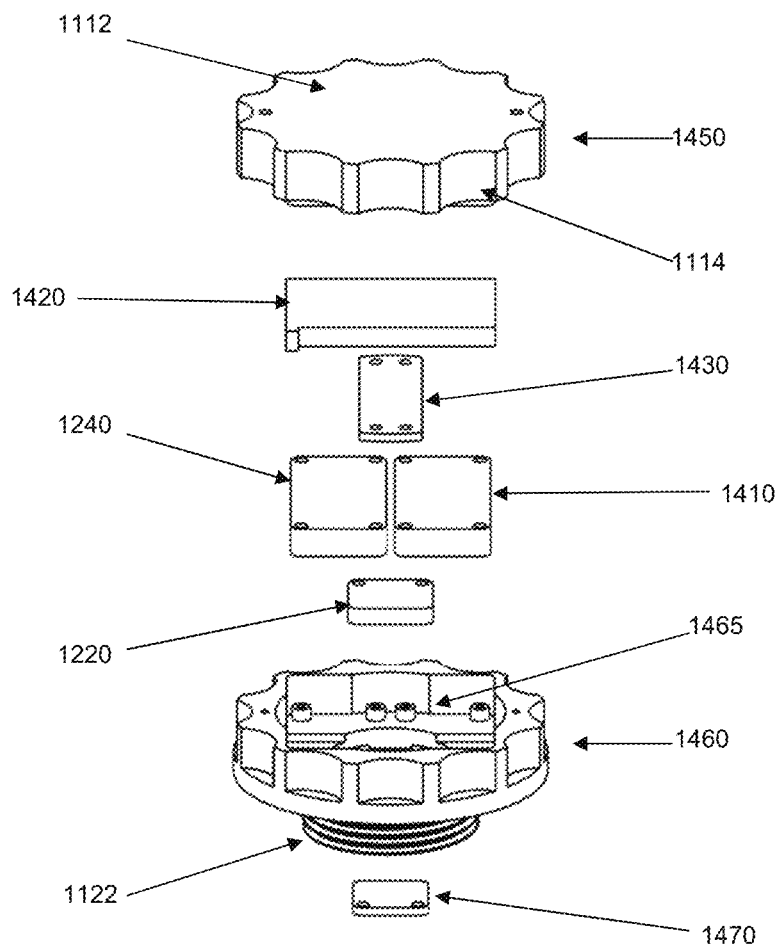
FIG. 2 shows an exploded view of the engine oil filler cap of the first embodiment.
Figure 3:
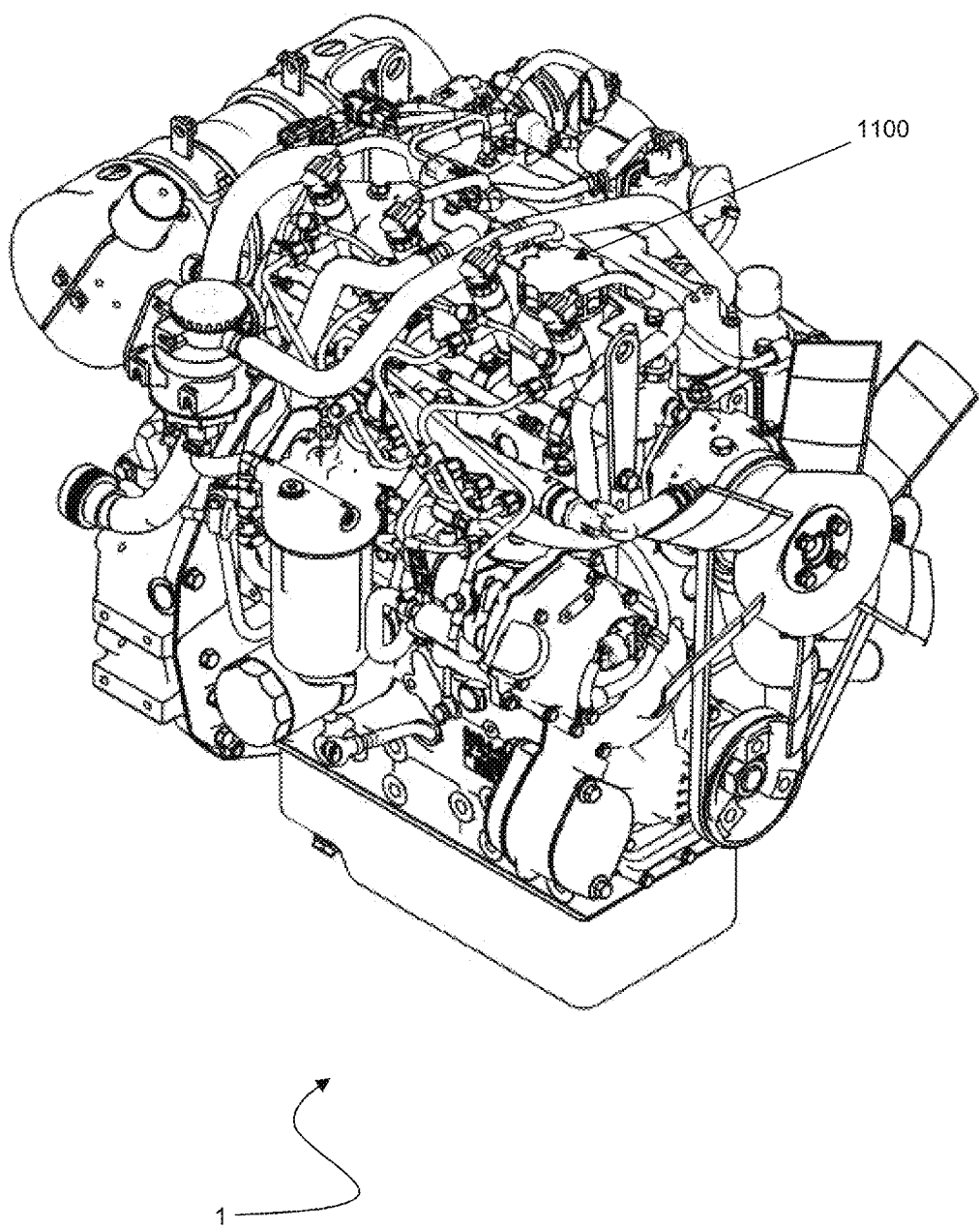
FIG. 3 shows an internal combustion engine with the engine oil filler cap of the first embodiment in situ.

FIG. 2 shows an "exploded" representation of an example assembly of the smart oil filler cap 1100. The assembly may comprise a processor, a communications module and a pressure sensor. The assembly may further comprise a battery 1420 and a battery brace 1430. The microprocessor 1240, communications module 1410, pressure sensor 1220, battery 1420 and battery brace 1430 may all arranged within a housing or body cavity 1465 in a filler cap body 1460. A cover 1450 may be fixed to the top of the filler cap body 1460 in order to close and seal the body cavity 1465.

The pressure sensor 1220 is located towards the bottom of the body cavity 1465 in the filler cap body 1460, such that when the smart oil filler cap 1100 is fitted to the engine, the vibration sensor is the closest component of the data logger 1200 to the crankcase of the engine. The pressure sensor 1220 may comprise a first sensor port and a second sensor port.

The battery brace 1430 may be arranged to hold the battery 1420 in place and the battery 1420 may be located above the data logger 1200 components, towards the top of the cavity within the smart oil filler cap 1100, such that when the smart oil filler cap 1100 is fitted to the engine, the battery 1420 is kept as far away from the engine as possible. During use, the engine may become hot, which can have a deleterious effect on the battery 1420. Therefore, by positioning the battery 1420 as far from the engine as possible, the battery 1420 may be better protected from the heat of the engine. Furthermore, the battery 1420 may be more easily accessible for replacement or recharging by removing the cover 1450. The cover 1450 may be fixed to the filler cap body 1460 in any suitable way, for example it may be a removable cover fixed to the filler cap body 1460 using a screw thread, or by screws or pins that pass through the cover 1450, into the filler cap body 1460. In an alternative, the cover 1450 may be removably fixed to the filler cap body 1460 in any other suitable way, for example using a push-fit fixing. In a further alternative, the cover 1450 may be fixed to the filler cap body in a non-removable way, for example by gluing or riveting.

The smart oil filler cap 1100 comprises a first conduit and a second conduit (not shown). The first conduit provides fluid communication between an external surface (e.g. top surface 1112, grip grooves 1114) of the smart oil filler cap 1100 that, in use, is located outwardly of the engine and a conduit in fluid communication with the first sensor port of the pressure sensor 1220. The second conduit provides fluid communication between an internal surface of the smart oil filler cap 1100 that, in use, is located to face into the engine and a conduit in fluid communication with the second sensor port of the pressure sensor 1220.

Accordingly, when the smart oil filler cap 1100 is received within an oil inlet of an internal combustion engine 1, the second opening is in direct fluid communication with the interior of the crankcase of the internal combustion engine 1.

In use, therefore, the pressure sensor 1220 may be configured to sense a pressure difference between the pressure at the first sensor port (e.g. atmospheric pressure) and the pressure at the second sensor port (e.g. crankcase pressure of the engine).

The communications module 138 may comprise a Bluetooth chip or other communication means.

In addition to a pressure sensor there may also be provided an accelerometer within the smart oil filler cap.

In use, the smart oil filler cap 1100 of the first embodiment of the disclosure is placed into the oil inlet of an internal combustion engine 1 so as to seal the inlet.

As with a prior art engine oil filler cap, when the smart oil filler cap 1100 is in situ in the oil inlet of an internal combustion engine 1, it will vibrate in unison with the internal combustion engine 1. Furthermore, the second sensor port of the pressure sensor will be in direct fluid communication with the crankcase of the internal combustion engine 1. Accordingly, a pressure at the second port of the pressure sensor 1220 is the same as the pressure, or at least predictably related to the pressure, within the crankcase of the engine.

Data derived from the pressure sensor 1220 may be used to calculate one or more of engine speed, torque and altitude.

Data derived from the accelerometer may be used to calculate engine speed, engine angle, engine orientation, engine incline and/or to note when engine oil level is topped up or refilled (or, more accurately, to determine when the smart oil filler cap is removed from the engine oil inlet).

The processor receives the sensed differential pressure data from the pressure sensor 1220.

Every time a cylinder fires, the cylinder pressure increases, forcing the piston downwards. A small amount of this cylinder pressure leaks into the crankcase, past the piston rings and valve seals. This causes a pulse in crankcase pressure every time a cylinder fires. Viewed at high speed, the crankcase pressure pulses occur at a frequency equivalent to the firing frequency of the engine.

The processor uses the sensed differential pressure data to determine engine firing frequency in Hz. This is achieved by the processor performing a time domain to frequency domain conversion in the crankcase pressure signal. This dominant frequency is assumed to be the firing frequency of the engine.

The firing frequency of the engine is related to engine speed in accordance with the following formula:

$$\text{Engine\_speed\_}(rpm) = \frac{\text{Firing\_frequency\_(Hz)} \times 60 \times 2}{\text{Number\_of\_engine\_cylinders}} \qquad \text{Equation 1}$$

Since a specific smart oil filler cap 1100 may be compatible with a number of different engines, the number of engine cylinders may not be known to the processor. Accordingly, in embodiments where the number of cylinders is not known to the processor, the processor may output the firing frequency of the engine to the communications module by which that data is onwardly transmitted as appropriate. On receipt of that data by an offboard processor, which has available the number of cylinders, the calculation above may be performed in order to determine the engine speed. The off board processor may be that of a smart device (such as a smart phone or tablet) running an application. The application may seek input from a user to identify the model of the engine or the exact engine serial number. Either way, this information may be used to consult a database capable of using the information to return details of the number of cylinders. Alternatively, it may be that the user is asked by the application to input the number of cylinders.

The calculation of engine speed may be performed on the off-board processor (e.g. on a smart device such as a smart phone or on the server). In this way, the calculations that require information about the engine other than that derived from the smart oil filler cap 1100 are not calculated on the smart oil filler cap 1100. In this way, the smart oil filler cap 1100 is generic and need not be in any way specific to the engine (other than needing to be mechanically compatible with a prior art engine oil filler cap of the same engine).

A registration procedure may be undertaken when the smart oil filler cap 1100 is first installed on an engine. The registration procedure may involve initiating a link in an off-board processor (most likely the server) between the unique smart oil filler cap 1100 and the internal combustion engine 1 to which it is attached. In one exemplary embodiment, the smart oil filler cap 1100 may comprise a QR code. As part of a set-up routine, the operator may be invited to use a smart device camera to photograph the unique QR code. The operator may also, as part of the same set-up routine, be invited to input the engine number of the engine to which the smart oil filler cap 1100 is attached. These two pieces of information (the unique identifier of the smart oil filler cap 1100 and the unique identified of the internal combustion engine 1) may then be linked to one another in a remote server that includes the database. In this way, the remote server is able to use the information regarding the engine stored in the database in combination with firing frequency data sent to the server from the smart oil filler cap 1100 in order to calculate engine speed in accordance with Equation 1.

As the skilled person would be well aware, a QR code is one of many possible alternatives that might be used to identify the smart oil filler cap 1100. Other options would include a barcode, a unique serial number, and RFID tag or any other technique for providing, displaying or transmitting a unique identifier.

Highspeed crankcase pressure, as determined by the smart oil filler cap 1100, may further be employed (e.g. in the off-board processor) in the calculation of engine torque. Cylinder pressure is proportional to torque. Accordingly, for the reasons already given, crankcase pressure is also proportional to torque. In a closed circuit breather engine (i.e. an engine where the crankcase gasses are filtered and ingested by the engine), as engine torque increases the crankcase pressure decreases. In an open circuit breather engine (i.e. an engine where the crankcase gasses are filtered and vented to atmosphere), as engine torque increases the crankcase pressure increases. The high speed crankcase pressure data traces can be processed to extract a value proportional to torque, regardless of breather system. Whether the engine is a closed circuit breather engine or an open circuit breather engine may be determined from the database once the unique engine identifier has been input during the registration procedure.

The RMS (signal average) of high-speed crankcase pressure is proportional to engine torque at a specific speed. A dynamic estimate of engine percent load (percentage of maximum available torque for the particular speed) may be calculated. The dynamic percent load estimate requires no calibration and improves in accuracy with time. Time history and histogram data is stored in the off-board server.

In a second embodiment of the smart oil filler cap 1100, the differential pressure sensor is substituted for an absolute pressure sensor located in fluid communication with the second opening. In both of the first and second embodiments, the accelerometer is optional.

The microprocessor may comprise or be used in conjunction with any suitable memory technology, for example it may comprise a storage disk and/or a solid-state storage device such flash memory and/or an SD (Secure Digital) card, and may comprise volatile and/or non-volatile memory. The communications module may be configured to support communications with one or more electronic devices external to the smart oil filler cap 1100 according to any one or more communications protocols/architectures. For example, the communications module may support one or more types of wired communications, such as USB, Firewire, Thunderbolt, Ethernet, etc and/or one or more types of wireless communications, such as WiFi, Bluetooth, Bluetooth LE, Near Field Communications (NFC), Infra-red (IR) 5G, LTE, UMTS, EDGE, GPRS, GSM, or any other form of RF based data communications. The communications module enables at least one communications interface to be established between the smart oil filler cap 1100 and an external network element. For example, the network element may be an electronic device, such as an internet server and/or a mobile telephone or smartphone and/or a tablet computer and/or a laptop computer and/or a desktop computer, etc. The interface may be a wired or wireless interface.

The frequency at which the sensor or sensors sample obtain sampled values may be every 2 ms (which is a sampling frequency of 500 Hz). However, the sampling frequency may be any suitable frequency, for example any frequency between 50 Hz-10,000 Hz, such as 200 Hz, or 1000 Hz, or 8000 Hz, or any frequency between 100 Hz-5000 Hz, such as 150 Hz, or 800 Hz, or 2000 Hz, or any frequency between 100 Hz-1000 Hz, such as 400 Hz, etc. The sampling frequency may be chosen in consideration of the maximum dominant frequency expected for engine firing frequency (for example, a sampling frequency that is sufficiently high to measure the maximum expected dominant frequency accurately).

Figure 4:
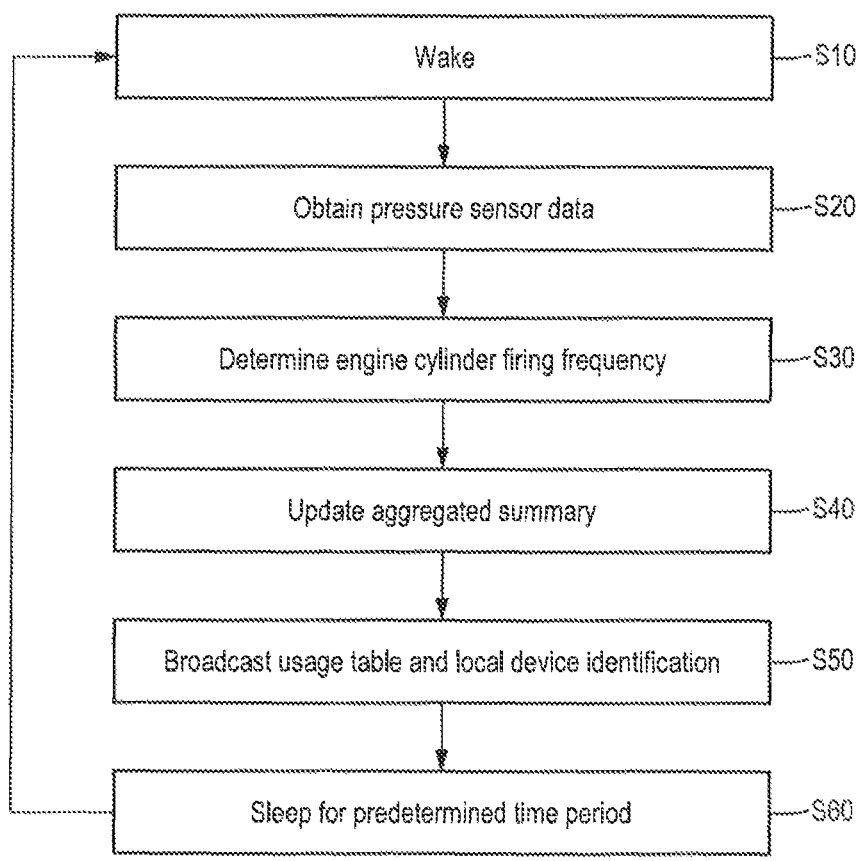
FIG. 4 shows a flow diagram of a monitoring routine performed by the local monitoring device according to an embodiment of this disclosure.
Figure 5:
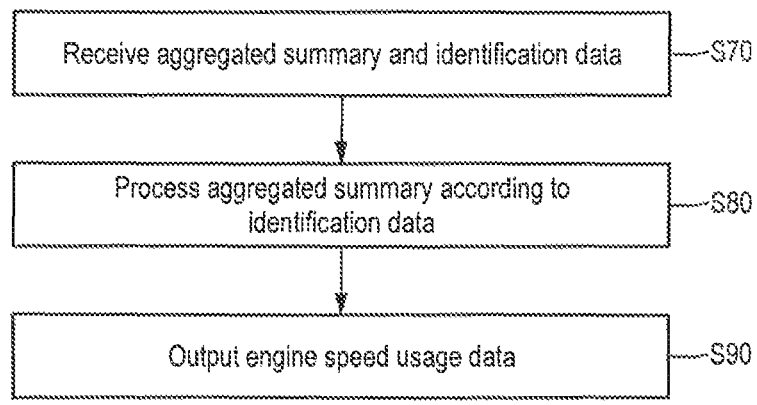
FIG. 5 shows a flow diagram of the processing steps performed by the remote application according to an embodiment of this disclosure.

An embodiment of a method of monitoring the usage of an internal combustion engine according to this disclosure is shown in FIGS. 4 and 5. The method according to this embodiment is performed using a local monitoring device and a remote application. FIG. 4 shows the method steps performed by the local monitoring device according to this embodiment while FIG. 5 shows the method steps performed by the remote application according to this embodiment.

In Step S10 of FIG. 5, the microprocessor 139 wakes from a lower power state. In step S20, the microprocessor 139 receives from the differential pressure sensor 1220 sensed differential pressure data indicative of the difference between the crankcase pressure and the external ambient pressure. The microprocessor 139 samples the differential pressure sensor data repeatedly over a time period to generate pressure sensor data (a pressure sensor data set). As such, data is generated in the microprocessor 139 which is representative of the crankcase pressure of the internal combustion engine.

The microprocessor 1240 samples the differential pressure sensor for a determination period of time, which may be any period of time that is sufficient for obtaining a reliable measurement of the firing frequency of the engine cylinders and/or the crankcase pressure of the internal combustion engine. For example, the determination period of time may be any period of time between 0.01 seconds to 10 minutes, such as 0.1 seconds, or 1 second, or 5 seconds, or 1 minute, or 8 minutes, or any period of time between 0.1 seconds to 1 minute, such as 0.3 seconds, or 3 seconds, or 10 seconds, or any period of time between 1 second to 1 minute, such as 8 seconds, or 42 seconds, etc. The microprocessor 139 may comprise a clock for counting the determination period of time, such as a processor clock, or a crystal clock, or a GPS synchronised clock. The microprocessor 139 may generate the pressure sensor data set by periodically sampling the value output from the differential pressure sensor 123. For example, it may sample the output from the differential pressure sensor 123 every 2 ms (which is a sampling frequency of 500 Hz) and record each of the sampled values during the determination period of time in order to generate data indicative of the crankcase pressure of the engine. The generated data may also be suitable for recording a plurality of vibrations indicative of the vibrations of the engine. The sampling frequency may be any suitable frequency, for example any frequency between 50 Hz-10,000 Hz, such as 200 Hz, or 1000 Hz, or 8000 Hz, or any frequency between 100 Hz-5000 Hz, such as 150 Hz, or 800 Hz, or 2000 Hz, or any frequency between 100 Hz-1000 Hz, such as 400 Hz, or 600 Hz, etc. The sampling frequency may be chosen in consideration of the maximum dominant frequency expected for the engine vibration (for example, a sampling frequency that is sufficiently high to accurately measure the maximum expected dominant frequency in the engine vibration).

Figure 6:
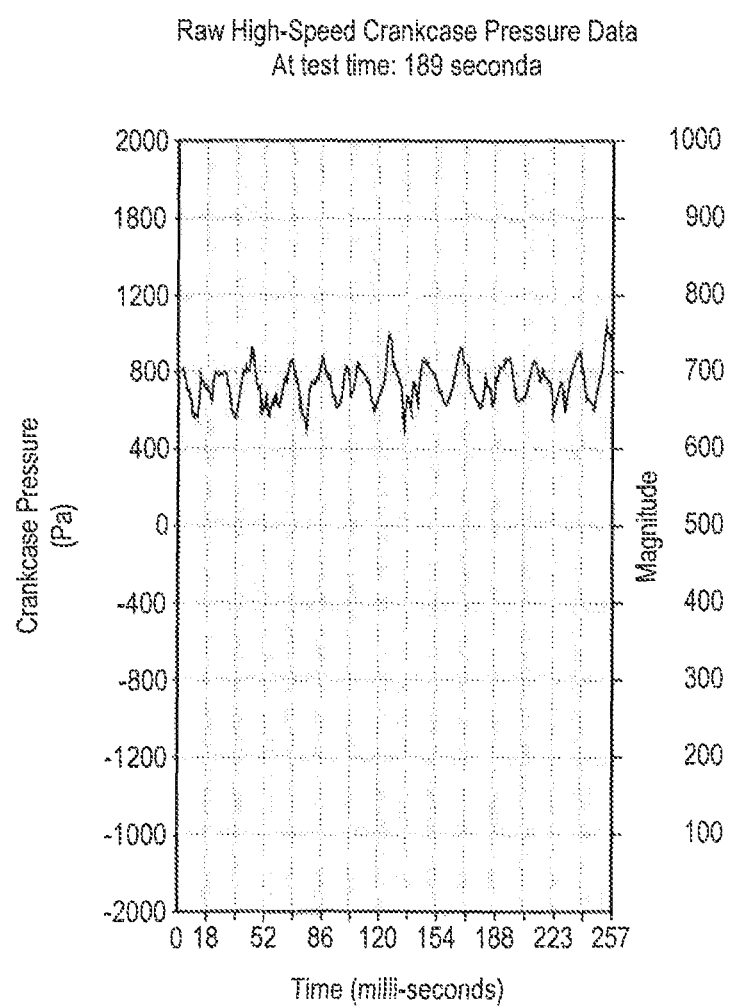
FIG. 6 shows a data plot of pressure sensor data generated by a differential pressure sensor according to an embodiment of this disclosure.

FIG. 6 shows an example plot of the differential pressure sensor data generated in Step S20. In this example, the sampling frequency is 500 Hz and the determination period of time is 0.256 second. The x-axis on the plot is the time and the y-axis on the plot is the difference between the crankcase pressure of the internal combustion engine and the ambient pressure in kPa.

In Step S30, the microprocessor 1240 determines the firing frequency of the cylinders of the engine based on the generated pressure sensor data. Every time a cylinder fires in the internal combustion engine, the cylinder pressure increases, forcing the piston downwards. A small amount of this cylinder pressure will leak into the crankcase, past the piston rings and valve seals. Accordingly a pulse in the crankcase pressure is generate every time a cylinder fires. Viewed at high speed, the crankcase pressure pulses occur at a frequency equivalent to the firing frequency of the engine. So, by performing a time domain to frequency domain transformation of the generated pressure sensor data, the firing frequency of the internal combustion engine may be determined. The firing frequency of the internal combustion engine may be the dominant frequency present in the frequency domain transformation of the pressure sensor data. The microprocessor 1240 may determine the dominant frequency for example by performing a time-to-frequency domain transformation on the recorded engine vibration, such as a Fourier transform, or a Fast Fourier Transform (FFT), or a Laplace transform, etc.

Figure 7:
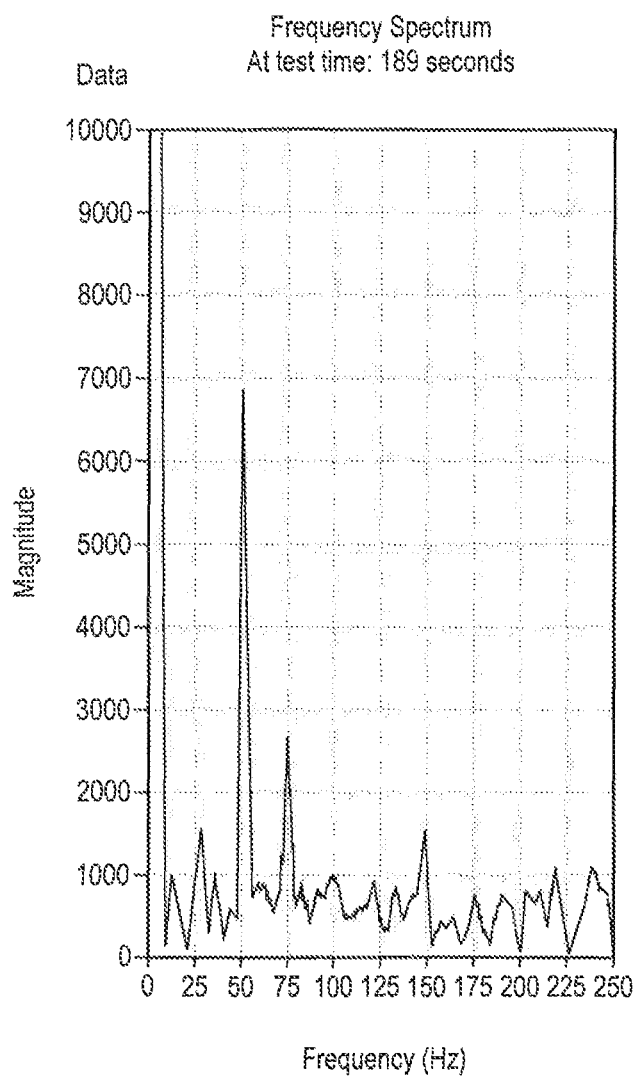
FIG. 7 shows a frequency domain transformation of the pressure sensor data shown in FIG. 8.

FIG. 7 shows a plot of the frequency response (i.e., the time-to-frequency transformation) of the generated pressure sensor data shown in FIG. 6. The x-axis of the plot in FIG. 7 is frequency in units of Hz and the y-axis of the plot in FIG. 7 is a dimensionless measure of magnitude.

The microprocessor 1240 may determine the dominant frequency by identifying the frequency with the greatest magnitude in the frequency response plot. The microprocessor 139 may consider only a particular range of frequencies within the frequency response when finding the dominant frequency. The range may be defined by a lower frequency limit and an upper frequency limit, both of which may be set in consideration of expected engine operation frequencies, in order to exclude any frequencies that fall outside of expected engine operation. The expected range of firing frequencies produced by an internal combustion engine will depend on the range of allowable engine revolution speeds during operation of the engine and the number of cylinders in the specific internal combustion engine. For example, if the idling speed of the engine is expected to generate a firing frequency of about 35 Hz and the maximum possible engine speed is expected to generate a firing frequency of about 90 Hz, the considered range may be 30 Hz (lower frequency limit) to 100 Hz (upper frequency limit). Of course, the maximum and minimum frequencies that an engine should generate will vary for different types of engine, for example with cylinder configuration (straight cylinder, V cylinder, Boxer, etc), engine speed limits and engine idle speeds. Therefore, the range of frequencies to be considered during determination of the dominant frequency may be set to allow for a range of different firing frequencies of different types internal combustion engines.

The dominant frequency may be the frequency corresponding to the peak frequency response. Where there are two or more peaks in the frequency response (for example, because the engine cylinder firing frequency changed during the measurement period of time), the dominant frequency may be the frequency corresponding to the peak with the greatest magnitude. Thus, the dominant frequency may be the firing frequency that was generated by the engine for the longest period of time during the measurement period of time.

In Step S40, the microprocessor 139 may record the determined firing frequency of the engine cylinders in the memory module of the microprocessor. There are a number of different ways in which the determined firing frequency may be recorded in the memory module. One exemplary way in which the determined firing frequency may be recorded in the memory module is explained below.

The microprocessor 139 may look up an element of an aggregated summary stored in the memory module based on the determined engine cylinder firing frequency. The aggregated summary may comprise a plurality elements corresponding to ranges of engine cylinder firing frequencies and the cumulative time for which the engine has been determined to be operating within each of the engine cylinder firing frequency ranges. As such, the aggregated summary is a data table comprising information regarding the usage history of the internal combustion engine for a plurality of ranges of engine firing frequencies. A non-limiting example of an aggregated summary according to this disclosure is set out below:

| Engine cylinder firing frequency | Cumulative time (Hours) |
| --- | --- |
| 0 Hz-10 Hz | 4.93 |
| 10 Hz-20 Hz | 6.76 |
| 20 Hz-30 Hz | 5.49 |
| 30 Hz-40 Hz | 2.65 |
| 40 Hz-50 Hz | 1.14 |
| 50 Hz-60 Hz | 5.32 |
| 60 Hz-70 Hz | 9.89 |
| 70 Hz-80 Hz | 3.10 |
| 80 Hz-90 Hz | 3.92 |
| 90 Hz-100 Hz | 0.74 |
| 100 Hz-110 Hz | 6.21 |
| 110 Hz-120 Hz | 4.42 |
| ... | ... |

It will be appreciated that the aggregated summary may comprise any number of engine cylinder firing frequency ranges, and the ranges may be of any suitable size and spread.

The microprocessor 1240 may determine which of the plurality of engine cylinder firing frequency ranges the determined engine cylinder firing frequency lies within and then add the determination period of time to the cumulative time for that element of the aggregated summary. As such, the local monitoring device generates an aggregated summary by updating an element of the aggregated summary based on the determined firing frequency of the engine. Accordingly, a picture of the operation of the internal combustion engine may be built up over time.

Preferably, the element of the aggregated summary is updated by incrementing the existing value of the element with an amount corresponding to the determination period of time. The determination period of time may be the amount time elapsed following a previous performance of the engine monitoring routine i.e. the amount of time elapsed since the previous engine firing frequency measurement.

In the example described above in respect of FIGS. 6 and 7, if the determined engine cylinder firing frequency is 50.5 Hz the microprocessor 139 may determine that the determined engine cylinder firing frequency lies within the range 50-60 Hz. The microprocessor 1240 may then add the determination period of time to the cumulative time recorded for that element in the aggregated summary. For example, if the cumulative time recorded in the aggregated summary for the element corresponding to the engine firing frequency range of 50-60 Hz is 5.32 hours, and the determination period of time is 27 seconds, the cumulative time recorded in the element representing the range 50-60 Hz will be updated to 5.3275 hours.

Having added the determination period of time to the cumulative time for the determined element of the aggregated summary, the microprocessor may then write the updated element to the aggregated summary in the memory module.

It will be appreciated that the engine firing frequency ranges and cumulative times may be saved in the memory module in any suitable way, for example using any known database or matrix techniques.

After recording the determined engine firing frequency to the memory module in accordance with the above exemplary method, the microprocessor 139 may return to Step S20. In this way, the engine cylinder firing frequency may be regularly determined, or sampled, (for example, every 0.5 seconds) and then stored in the memory module, such that extensive engine firing frequency data may be stored over time without an increase in the size of the aggregated summary stored in the memory module.

It will be appreciated that after recording of the values indicative of sensed crankcase pressure over the determination period of time is completed in Step S20 and the process proceeds to Step S30, recording of values indicative of sensed crankcase pressure for the next determination period of time may immediately begin whilst Steps S30 and S40 are being performed, such that there is no period of operation of the engine that does not contribute to a determination of the engine cylinder firing frequency. Consequently, whilst Steps S30 and S40 are being carried out in respect of the most recently completed recording of the values indicative of sensed crankcase pressure, the next recording of values indicative of sensed crankcase pressure may already be underway.

In step S50, the microprocessor 1240 may broadcast/transmit the aggregated summary to a remote application. The broadcasting step may be performed every time the aggregated summary is updated. Alternatively, the broadcasting step may only be performed after at least: 50, 100, 200, 500, 1000, or 5000 updates to the aggregated summary. For example, the local monitoring device may be configured to broadcast at least once, twice or three times per day. By limiting the number of times the local monitoring device broadcasts the aggregated summary, the local monitoring device may conserve power and not utilise excessive amounts of bandwidth of a communications network.

In step S50, the microprocessor 1240 also broadcasts/transmits identification data which allows a remote application to identify the internal combustion engine to which the local monitoring device is connected to. For example, the processing and communications module 110 may broadcast a unique identification code, for example a serial number of the local monitoring device or a media access control (MAC) address of the local monitoring device.

The microprocessor 1240 may transmit/broadcast the aggregated summary and the identification data over a wireless network to a remote application which may be executed on a remote server.

After updating the aggregated summary in step S40, or broadcasting the data in step S50, the local monitoring device may optionally sleep for a predetermined period of time before performing the next measurement of the crankcase pressure. For example, the local monitoring device may sleep for 30 seconds, 60 seconds, 120 seconds or 240 seconds. According to the embodiment shown in FIG. 4, the sleep step S60 is configured to sleep the device for a period of 30 s. During the sleep step, the local monitoring device may operate in a low power state. The microprocessor 1240 may consume little or no energy, and the pressure sensor may not be operated/powered until the sleep step is over. By sleeping for a period of time between measurements of the crankcase pressure, engine monitoring by the local monitoring device may be performed for an extended period of time whilst conserving power of the local monitoring device. In order to ensure that the total time in the aggregated summary reflects the usage of the engine, the predetermined period of time for the sleep step duration S60 may be used as the determination period for incrementing the cumulative time recorded in an element of the aggregated summary.

Preferably, the above described engine monitoring routine is repeated over time in order to build up a history of engine usage data over a time period (an aggregated summary of the engine usage). The time period may be at least a single day, a week, a month or a year. The engine monitoring routine may be repeated a plurality of times in a single day. As discussed above, preferably steps S10, S20, S30 and S40 are performed in sequence and repeated relatively frequently, for example every 30 seconds in order to build up a profile of the usage of the engine. Step S50 is preferably performed only a few times each day, in order to conserve the battery of the local monitoring device.

Figure 8:
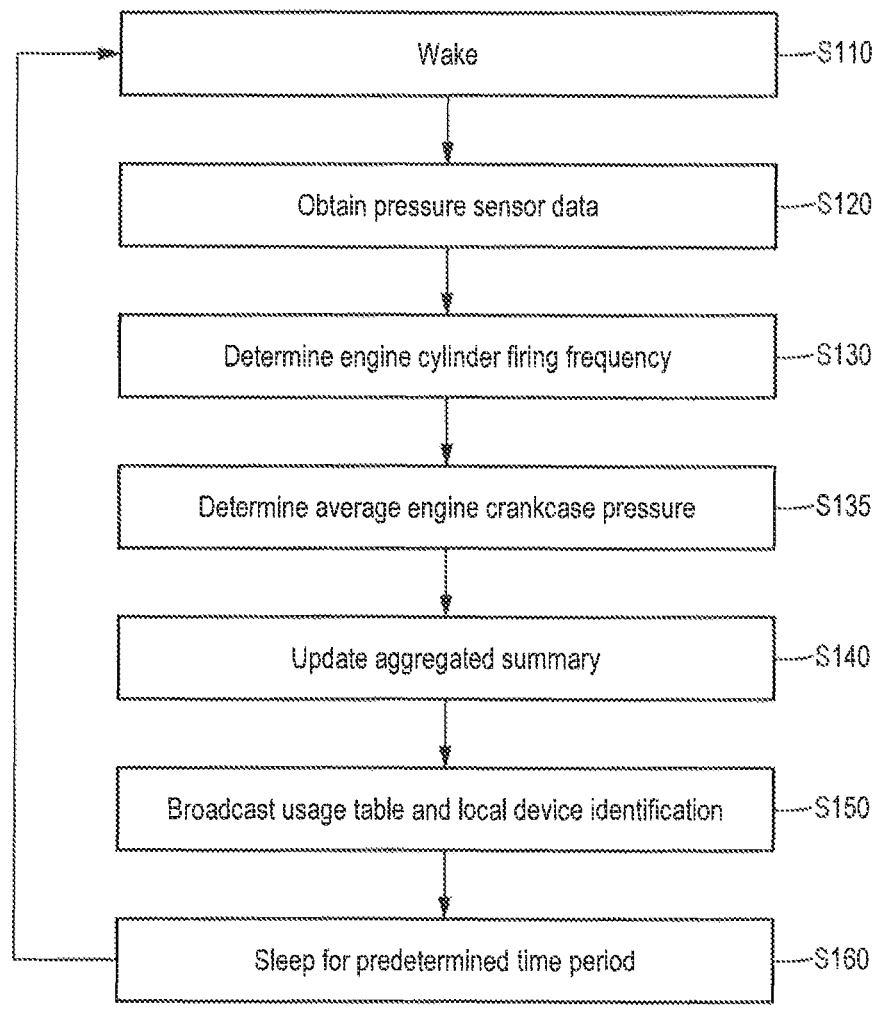
FIG. 8 shows a flow diagram of a monitoring routine performed by the local monitoring device according to a further embodiment of this disclosure.
Figure 9:
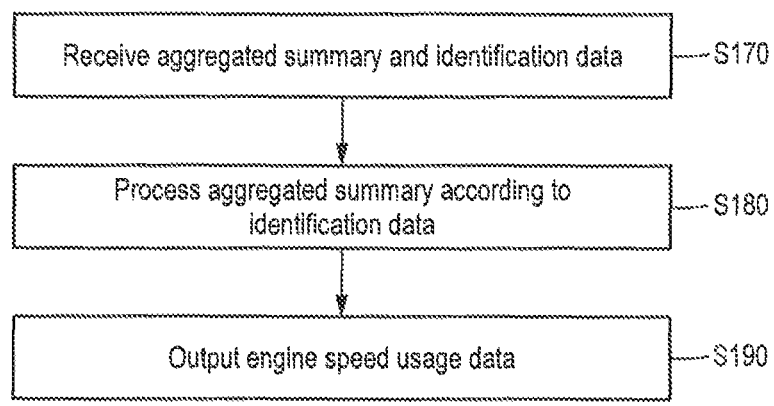
FIG. 9 shows a flow diagram of the processing steps performed by the remote application according to a further embodiment of this disclosure.

FIG. 8 shows the method steps performed by the local monitoring device according to this further embodiment while FIG. 9 shows the method steps performed by the remote application according to this further embodiment.

As shown in FIG. 8, the local monitoring device performs a monitoring routine for monitoring the pressure of an engine crankcase. Step S110 of waking, step S120 of obtaining pressure sensor data and step S130 of determining the engine cylinder firing frequency may be performed as described in steps S10, S20 and S30 respectively according to the previous embodiment.

In step S135 of this further embodiment, the average engine crankcase pressure is determined. Preferably, the root mean square (RMS) of the engine crankcase pressure is determined by the microprocessor from the data points recorded from the pressure sensor.

In step S140 the determined values of engine firing frequency and RMS crankcase pressure are used to generate an aggregated summary of the engine usage. As with Step S40 of the previous embodiment, the aggregated summary comprises a plurality of elements which reflect the cumulative usage of the internal combustion engine. In this further embodiment, the elements of the aggregated summary are provided in a matrix form, whereby the determined values of engine firing frequency and RMS crankcase pressure are used to select an element to be updated.

The aggregated summary may comprise a plurality elements corresponding to ranges of engine cylinder firing frequencies and ranges of crankcase pressures. Each element in the aggregated summary containing a value indicative of the cumulative time for which the engine has been determined to be operating within engine cylinder firing frequency ranges and crankcase pressure range. As such, the aggregated summary is a data table comprising information regarding the usage history of the internal combustion engine for a plurality of ranges of engine firing frequencies and a plurality of crankcase pressure ranges. A non-limiting example of an aggregated summary according to this embodiment of the disclosure is set out below:

Histogram of time (seconds) spent at each firing frequency
and crankcase pressure RMS for the engine.

| | | 30 | 40 | 50 | 60 | 70 | 80 | 90 | 100 | 110 | 120 | 130 | 140 | 150 |
|---|---|---|---|---|---|---|---|---|---|---|---|---|---|---|
| | | | | | | | Frequency (Hz) | | | | | | | |
| RMS CCPress (kPa) | 1.5 | | | | | | | | | | | | | |
| | 1.4 | | | | | | | 16 | 65 | 44 | 41 | | | |
| | 1.3 | | | | | | 61 | 100 | 52 | 18 | 81 | | | |
| | 1.2 | | | | 93 | 12 | | 74 | 81 | 1 | 93 | 15 | | |
| | 1.1 | | | | 57 | 37 | | 1 | 51 | 24 | 11 | 41 | | |
| | 1.0 | | | 85 | 81 | 87 | | 99 | 40 | 56 | 37 | 1 | | |
| | 0.9 | | 1 | 14 | 7 | 79 | | 56 | 57 | 87 | 6 | 67 | | |
| | 0.8 | | 50 | 63 | 64 | 33 | | 20 | 40 | 79 | 22 | 57 | | |
| | 0.7 | | 27 | 53 | 12 | 12 | | 99 | 6 | 20 | 4 | 30 | 31 | |
| | 0.6 | | 23 | 66 | 79 | 33 | | 7 | 32 | 82 | 67 | 28 | 39 | |
| | 0.5 | | | | | | | | | | | | | |

In the aggregated summary above, the columns of the table/matrix represent columns of elements corresponding to ranges of engine cylinder firing frequency. The rows of the table/matrix represent rows of elements corresponding to RMS crankcase pressures (MRS CCPress (kPa)).

As an example of the updating the aggregated summary, in the aggregated summary provided above if the determined RMS crankcase pressure was 1.25 kPa and the determined engine cylinder firing frequency was 95 Hz, then the element with a value of 74 would be selected to be incremented by the determination time period.

As discussed for the previous embodiment, after step S140, the local monitoring routine may proceed to a broadcasting step S150, or the local monitoring routine may proceed to a sleep step S160 if it is not required to broadcast the aggregated summary at that point.

Broadcasting step S150 may be substantially the same as broadcasting step S50 but broadcasting the larger aggregated summary with both crankcase pressure and engine cylinder firing frequency data included.

Sleep step S160 may be substantially the same as broadcasting step S60.

INDUSTRIAL APPLICABILITY

By providing a smart oil filler cap 1100, data regarding engine running characteristics may be obtained. Even if the smart oil filler cap 1100 is fitted to an engine post manufacture of the engine, the time and inconvenience associated with its installation is minimal. Furthermore, the operator is not inconvenienced in any way and may not even be aware of the installation of the smart oil filler cap 1100. Since the smart oil filler cap 1100 is configured to determine engine firing frequency though sensing pressure and or vibrational frequency, the smart oil filler cap 1100 does not require detailed knowledge of the engine to which it is attached in order to provide a meaningful output. By enabling the smart oil filler cap 1100 to be registered to a particular engine (e.g. via an application on a smart phone) the data provided by the smart oil filler cap 1100 may be combined with data identifying features of the engine (e.g. number of engine cylinders) in order to obtain further information about engine performance, including engine speed in revolutions per minute (RPM) and torque.

By assembling the measured data in an aggregated summary, only the summary information needs to be transmitted off the smart oil filler cap 1100. In this way, the amount of data (by which is meant the number of data points in the aggregated summary) to be transmitted does not increase with time. Furthermore, in the event that the engine (and hence the attached smart oil filler cap 1100) is moved away from an area where data transmissions are received, when subsequent transmissions are received, all of the aggregated data will be sent which will include within the aggregated summary the data obtained during the period in which no transmissions were received.

In this way, the bandwidth required for communication is low, which enables a wider range of communication options to be employed and also reduces costs associated with data transmission.

Furthermore, since the smart oil filler cap 1100 is compatible with legacy engines that are entirely mechanical and have no electronic control system, data regarding engine running characteristics can be obtained from a population of engines for which hitherto little or no in-the-field engine running data has been obtained.

Furthermore, since the smart oil filler cap 1100 requires only mechanical compatibility with an oil inlet of an engine, one single smart oil filler cap 1100 can be provided for use on any one of an entire range of engines. This reduces costs and increases the likelihood of availability.

The invention claimed is:

1. An engine oil filler cap for monitoring an internal combustion engine comprising:
   a processor;
   a sensor module comprising a pressure sensor configured to sense crankcase pressure of the internal combustion engine and to output data representative of the sensed crankcase pressure to the processor;
   wherein the engine oil filler cap is configured to provide a housing for the processor; and
   the processor is configured to determine a value representative of the firing frequency of the internal combustion engine based on the output data.

2. The engine oil filler cap of claim 1 wherein the processor is configured to calculate a root mean squared value of engine crankcase pressure.

3. The engine oil filler cap of claim 2 wherein the processor is configured to generate an aggregated summary of the total engine running at each combination of firing frequency and root mean squared engine crank case pressure.

4. The engine oil filler cap of claim 3 wherein the aggregated summary is updated at a predetermined update frequency by incrementing the aggregated summary with a current value of firing frequency and a current value of root mean squared engine crank case pressure.

5. The engine oil filler cap of claim 3 wherein the aggregated summary takes the form of a histogram.

6. The engine oil filler cap of claim 3 further comprising a communications module, wherein the communications module is configured to transmit the aggregated summary.

7. The engine oil filler cap according to claim 1 wherein the engine oil filler cap further comprises an inner portion, an outer portion and a seal between the inner portion and the outer portion, wherein the inner portion is configured to be received into an oil filler cap aperture of an engine and the seal is configured to seal the oil filler cap insertion aperture of the engine.

8. The engine oil filler cap of claim 7 wherein the engine oil filler cap comprises a first fluid conduit between an exterior surface of the inner portion and a first sensing port of the pressure sensor.

9. The engine oil filler cap of claim 8 wherein the engine oil filler cap further comprises a second fluid conduit between an exterior surface of the outer portion and a second sensing port of the pressure sensor.

10. The engine oil filler cap of claim 9 wherein the pressure sensor is a differential pressure sensor configured to sense a differential pressure between the first sensing port and the second sensing port.

11. The engine oil filler cap according to claim 1 wherein the processor is configured to receive engine crankcase pressure and to determine a frequency of crankcase pressure oscillation thereby to determine the value representative of the firing frequency.

12. The engine oil filler cap according to claim 1 wherein the sensor module comprises a vibration sensor, wherein the sensed characteristic of the internal combustion engine comprises vibration data with time.

13. The engine oil filler cap of claim 12 wherein the sensed characteristic comprises both engine crankcase pressure and engine vibration data, and wherein the processor uses both engine crankcase pressure and engine vibration data to improve accuracy of firing frequency determination.

14. The engine oil filler cap according to claim 1 further comprising one or more additional transducers, such as a temperature sensor, wherein, optionally, the communications module is configured to transmit data derived from the one or more additional transducers.

* * * * *